318-135 SR

4/7/87 OR 4,656,400

United States Patent [19]

Pailthorp et al.

[11] Patent Number: 4,656,400

[45] Date of Patent: Apr. 7, 1987

[54] VARIABLE RELUCTANCE ACTUATORS HAVING IMPROVED CONSTANT FORCE CONTROL AND POSITION-SENSING FEATURES

[75] Inventors: Robert M. Pailthorp; Joseph J. Stupak, Jr., both of Portland; Randall B. Elliott, Beaverton, all of Oreg.

[73] Assignee: Synektron Corporation, Portland, Oreg.

[21] Appl. No.: 752,956

[22] Filed: Jul. 8, 1985

[51] Int. Cl.[4] .......... H02K 41/00

[52] U.S. Cl. .......... 318/135; 310/14; 361/154

[58] Field of Search .......... 361/154; 310/30, 14; 318/114, 128, 132, 135

[56] References Cited

U.S. PATENT DOCUMENTS 3,413,457 11/1968 Wieder .
3,671,814 6/1972 Dick .......... 361/154
3,857,081 12/1974 Gebelein, Jr. .
4,434,450 2/1984 Gareis .
4,450,427 5/1984 Gareis .

OTHER PUBLICATIONS

U.S. Patent Application Serial No. 639,187, filed Aug. 9, 1984, Joseph J. Stupak, Jr.

*Primary Examiner*—Donovan F. Duggan
*Attorney, Agent, or Firm*—Chernoff, Vilhauer, McClung & Stenzel

[57] ABSTRACT

A variable reluctance actuator, of either the linear or rotary type, having a moving element operated by a solenoid, is controlled by a Hall effect sensor signal representative of flux density in the magnetic circuit of the actuator. The actuator may be operated in either a constant-force control mode, or a position-sensing or control mode. Substantially constant force, independent of position of the actuator's movable element, is obtained by varying, rather than stabilizing, the sensed magnetic field during movement. Position sensing, independent of actuator force, is obtained by variably controlling the magnitude of the excitation current of the Hall effect sensor in response to the magnitude of the coil current and Hall sensor output.

7 Claims, 4 Drawing Figures

VARIABLE RELUCTANCE ACTUATORS HAVING IMPROVED CONSTANT FORCE CONTROL AND POSITION-SENSING FEATURES

BACKGROUND OF THE INVENTION

This invention relates to variable reluctance actuators of either the linear or rotary type, and particularly to those whose mechanical force or position may be controlled throughout a range of movement of their movable element.

Variable reluctance electromagnetic actuators are well known in the art as exemplified by the linear motion solenoid devices shown in U.S. Pat. Nos. 3,671,814, 4,434,450 and 4,450,427. Although such devices disclose the possibility of controlling the force imposed by such actuators in a constant, controlled manner independent of actuator position, in practice they are unable to obtain this result. For example, in U.S. Pat. No. 3,671,814, a flux sensor is placed in the variable gap of the actuator's magnetic circuit for controlling coil current such that the magnetic field experienced by the flux sensor remains constant independent of position of the actuator. Although holding the field in the variable gap constant theoretically should produce constant force, in reality motion of the actuator changes the boundary conditions of the magnetic field such that the force produced varies significantly with motion. If the flux sensor is not placed in the variable gap, as in U.S. Pat. Nos. 4,434,450 and 4,450,427, a further variable is introduced because, as the actuator retracts, flux leakage circumventing the variable gap increases. Accordingly, holding constant the magnetic field experienced by such a fixed gap flux sensor likewise does not usually produce constant force independent of motion. Moreover, permitting the variable gap to close completely upon retraction, as taught by the latter two patents, further varies the actuating force by increasing it abruptly as the actuator nears full retraction.

None of the aforementioned variable reluctance actuators has a built-in capability for position sensing or position control between two stop positions. However, an integral means of position control for such variable reluctance actuators is disclosed in the copending, commonly-owned U.S. patent application of one of the inventors herein, Ser. No. 639,187, filed Aug. 9, 1984. As disclosed in such patent application, coil current which produces the actuator's magnetic field, and the instantaneous magnetic flux density of such field, are sensed concurrently and signals representative of each are fed to a divider which divides the coil current magnitude by the flux density magnitude, yielding a signal proportional to actuator position. Such a system, however, requires both a flux sensor and a divider in the position-sensing circuit which is costly. U.S. Pat. No. 3,413,457 discloses a general-purpose analog computer circuit using a Hall effect sensor as a divider in a constant-reluctance magnetic circuit. However, there is no suggestion of how such principle could be applied to a variable reluctance magnetic circuit to indicate position of a movable element.

SUMMARY OF THE PRESENT INVENTION

The present invention overcomes the foregoing disadvantages of force control and position-sensing systems utilized previously in variable reluctance actuators, and is applicable both to linear and rotary motion types of actuators. The word "actuator" is used broadly herein to include sensors as well as devices used principally to produce force or motion.

Substantially constant force control, independent of actuator position, is achieved by variation, rather than stabilization, of the magnetic field produced by the coil and sensed by the flux sensor. In essence, coil current is controlled in response to a variably modified flux sensor output signal, the modification being appropriate to compensate for such variables as flux leakage and boundary conditions which change with position. Also, the coil configuration is distributed nonuniformly relative to the movable element of the actuator, and the variable gap is prevented from closing completely upon full retraction. The result is that the flux density of the magnetic field produced by the coil, whether measured in the variable gap or elsewhere, varies significantly during motion, while the retracting force varies very little and, in any case, to a much lesser degree than the flux density.

Simplified position sensing, without the need for a divider, is obtained by automatic variation of the excitation current (or equivalent variation of the excitation voltage) of the Hall sensor so that the output of the sensor is always proportional to coil current. In a variable reluctance magnetic circuit, such variation results in the sensor's excitation current being representative of the position of the movable element causing the variable reluctance.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 2:
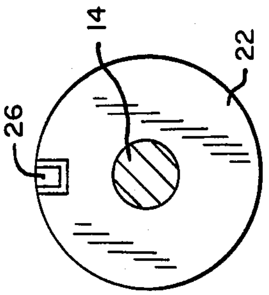
FIG. 2 is a view taken along line 2—2 of FIG. 1.
Figure 1:
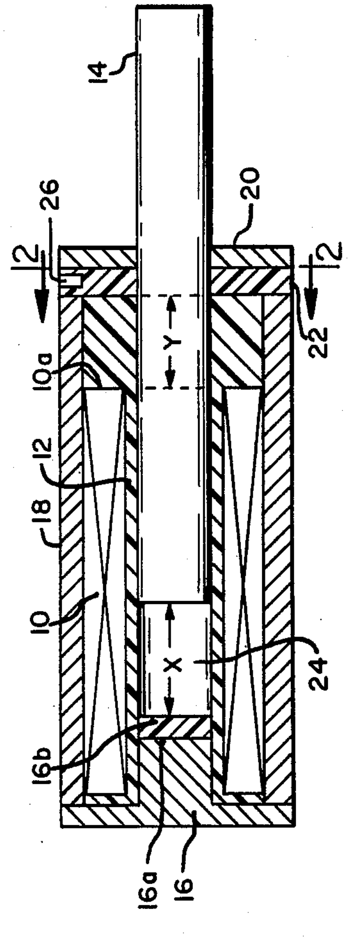
FIG. 1 is a side, cross-sectional view of a simplified, exemplary variable reluctance linear actuator constructed in accordance with the present invention.

The mechanical structure of an exemplary, simplified variable reluctance linear actuator constructed according to the present invention is shown in FIGS. 1 and 2. The actuator employs a solenoid 10 wound on a spool 12 which may serve not only to provide the solenoid with shape but also as a bearing for the movable element 14 of the actuator. Spool 12 would typically be made of some type of nonmagnetic, nonconductive material, such as nylon or polycarbonate. The element 14 is made of a suitable magnetic material such as iron. As used herein, "magnetic material" is defined as a material that exhibits enhanced magnetization when placed in a magnetic field. The element 14, when placed within the solenoid 10 with an electrical current therein, experiences a magnetic flux along its longitudinal axis thereby producing a mechanical force tending to retract it. Extension of the element 14 may be produced by an external or internal opposing return force mechanism, such as a spring or fluid pressure mechanism.

The actuator is provided with a first end cap 16, which also serves as a stop for the movable element 14, a tubular case or core 18, and a second end cap 20, all of which are preferably composed of magnetic material to maximize the efficiency of the actuator. The end cap 20 is separated from the casing 18 by a disc-shaped, nonmagnetic spacer 22 in order to provide a location for a magnetic flux density sensor 26. The space 24 between the inner surface 16*a* of the end cap 16 and the moving element 14 comprises a variable reluctance air gap. This gap, whose reluctance varies with the position of the element 14, accounts for the majority of the reluctance in the primary magnetic circuit composed of the element 14, end caps 16 and 20, casing 18, the gap occupied by the spacer 22 and the variable gap 24.

The end cap 16 has a further spacer 16*b* of nonmagnetic material on the inner surface thereof to prevent the variable gap 24 from closing completely upon full retraction of the element 14, and the coil 10 is shortened at its outer end 10*a*, i.e. its end most remote from the variable gap 24, for reasons to be described hereafter.

An instantaneous magnetic flux density sensor 26 is disposed between the end cap 20 and the casing 18 in the space created by the nonmagnetic spacer 22. The spacer 22 extends completely through the primary magnetic circuit of the actuator between the end cap 16 and casing 18 which, although introducing some additional reluctance into the magnetic circuit, serves to ensure symmetrical flux distribution and therefore an accurate sample reading by the sensor 26. Preferably the sensor 26 comprises a Hall effect transducer, although other flux sensors, such as magnetoresistive devices which provide a signal representative of magnetic flux density, might be used without departing from the principles of the invention. Although a particular location of the sensor 26 is shown, it is to be recognized that the sensor could be placed anywhere within the magnetic circuit of the actuator. However, since the flux density of the field produced by the coil does not vary identically everywhere in the magnetic circuit, modifications to the control circuit may be appropriate for some locations depending upon the characteristics of flux variation at those locations.

It should be mentioned that the accuracy and effectiveness of the force control, and position sensing and control, functions to be discussed hereafter may depend on the quality of the magnetic material used in the actuator structure. Preferably, such material should be as magnetically soft as is feasible to minimize any unintended permanent magnetization thereof and any resultant alteration of the actuator's magnetic circuit characteristics.

Force Control System

The retracting force experienced by the moving element 14 as a result of the current in the solenoid coil 10 is not, in reality, a simple function of the total magnetic flux that the element experiences, nor of the flux in the variable gap 24, nor of the flux in the gap defined by the spacer 22. A major variable to be taken into account is the fact that, as the element 14 retracts, the area through which flux can leak from the element 14 to the casing 18 varies with the position of the element 14. Also, the boundary conditions of the magnetic field in the variable gap 24 change significantly as the position of element 14 changes. Moreover, if complete closure of the variable gap 24 were permitted, the magnetic permeance of the gap would increase abruptly as complete closure is approached. For all of these reasons, controlling current in the solenoid coil 10, as the element 14 is retracted, in such a way as to maintain constant the magnetic field experienced by the flux sensor 26, regardless of where it is placed, will usually not yield even an approximately constant retracting force on the element 14. Instead, the sensed magnetic field, whether in the variable gap 24 or elsewhere in the magnetic circuit, must be controlled so as to vary with the position of the moving element 14 in order to achieve substantially constant retracting force. Without such control, retracting force is highly variable between full extension and full retraction. For example, in the actuator of FIG. 1, retracting force is relatively high at both full extension and full retraction, and lower in the range of movement between these two extremes.

In the present invention, much of the substantial rise in retracting force in the vicinity of complete retraction is eliminated by the provision of the nonmagnetic spacer 16*b* which prevents complete closure of the variable gap 24. The thickness of the spacer 16*b* will be different for each different actuator design, but is easily determined for any design by simply plotting retracting force against actuator position ("X" in FIG. 1) while holding the sensed magnetic field constant, and thereby determining the degree of retraction of element 14 which causes the force to begin to rise rapidly near full retraction. The thickness of the nonmagnetic spacer 16*b* can then be selected so as to prevent closure of the gap 24 beyond such point.

A significant, although more gradual, increase in retracting force in proportion to greater extension of the moving element 14 would be produced if the magnetic field experienced by the sensor 26 were held constant by control of current in the coil. This phenomenon, caused by decreasing flux leakage as the element 14 extends, and by changing boundary conditions of the field in the variable gap, is corrected by the force control circuit of FIG. 3, to be explained hereafter. The correction results in a progressive decrease in sensed magnetic field during extension. This, however, is accompanied by some relative elevation of the retracting force in the vicinity of full retraction, despite the presence of the spacer 16*b*. It has been discovered that this latter elevation in force near full retraction can be compensated for by distributing the turns of the solenoid coil nonuniformly along the length of element 14. For example, FIG. 1 shows shortening of the solenoid coil 10 at its end 10*a* remote from the variable gap 24 such that a predetermined length "y" (FIG. 1) of element 14, approximately equal to the length of the variable gap at the point of retraction where such elevation in force begins without shortening of the coil, is prevented from being coextensive with the coil 10 (although it is coextensive with the case 18) regardless of the position of the element 14.

The final result of all of the foregoing adjustments is a retracting force which is substantially constant throughout the range of motion of the movable element 14, although the flux density of the magnetic field produced by the coil varies significantly with such motion regardless of whether such flux density is measured in the variable gap 24 or in the fixed gap defined by the spacer 22. This is a somewhat incongruous result from a simple theoretical point of view, because the retracting force of element 14 would normally be thought to vary proportionally to the square of the flux density, and therefore to a greater degree than the flux density. Instead, the reverse is true, i.e. the flux density varies to a greater degree than the force.

Figure 3:
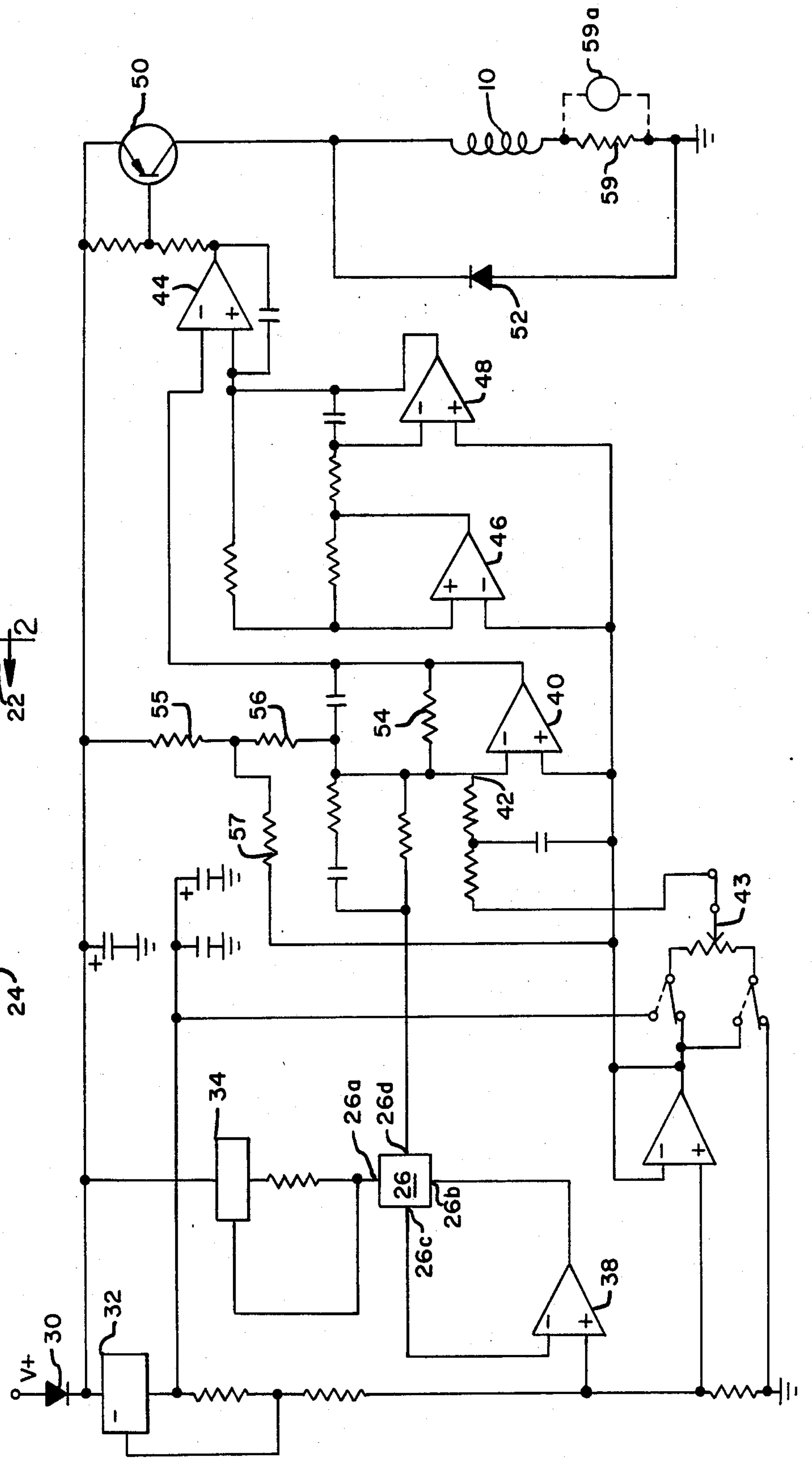
FIG. 3 is a diagram of an exemplary electrical circuit for producing constant force control, usable with the actuator of FIG. 1.

The circuit of FIG. 3 is the most significant part of the overall solution to the constant force problem, because it effectively compensates both for the variation in leakage flux between the moving element 14 and the casing 18, and the variation of the magnetic field boundary conditions, during motion. Diode 30, connected to the power source, protects the circuit from reverse voltage applications, and is connected to a voltage regulator 32. Excitation current is supplied from current regulator 34 to the Hall effect sensor 26 having excitation terminals *26a* and *26b*, and output terminals *26c* and *26d* respectively.

An amplifier 38 controls the voltage on one of the excitation terminals *26b* so that one of the output terminals *26c* is always kept at a common reference potential. As a result, the flux sensor's amplifier 40 constitutes a simple amplifier, instead of a more complicated differential amplifier having precision-matched resistors as is normally required. This advantageous simplification of the circuit is applicable to virtually any Hall sensor output circuit in a magnetic device.

The signal from output terminal *26d* of the Hall effect sensor 26 is presented to a summing junction 42 at the inverting input of amplifier 40 where it is compared to a force input reference signal which is adjustable by means of adjustable potentiometer 43. The output of amplifier 40 is presented to the inverting input of comparator 44, where it is combined with a sawtooth signal at the noninverting input of comparator 44 generated by a sawtooth oscillator composed of amplifiers 46 and 48 and their related circuitry. The output of comparator 44 controls the current and/or voltage to the solenoid coil 10 by its control of a power transistor 50 in a pulse width modulated switching mode dependent upon the level of the output signal from amplifier 40. The result is such that when the output signal from the Hall effect sensor 26 momentarily exceeds the force input reference signal, transistor 50 decreases coil current, and vice versa. Alternatively, the transistor 50 could be operated in an analog mode, although power efficiency would be decreased. A flyback diode 52 is provided so that the current generated in the coil 10 by the collapsing magnetic field, during periods when the transistor 50 is switched off, recirculates through the coil causing the field to decay exponentially rather than in an oscillatory manner.

Without the inclusion of resistor 54, the circuit of FIG. 3 would merely control the transistor 50 so as to provide whatever coil current is necessary to maintain the field sensed by the Hall effect sensor 26 at a constant magnitude independent of position of the actuator, as in the prior art. However, due to the feedback connection through resistor 54, negative DC feedback is provided, and the DC gain of amplifier 40 is thereby controlled. Such negative feedback requires that the output of the Hall effect sensor change in order to effect a change in the coil current. Accordingly, the current in the coil 10 does not increase with extension to the extent that it otherwise would in the absence of the feedback through resistor 54, with the result that the magnetic field measured by sensor 26 is controllably decreased progressively with extension, to a degree dependent upon the resistance of resistor 54. This compensates for decreased flux leakage and varying boundary conditions caused by extension, and thereby prevents the retracting force from increasing with extension. Conversely, the sensed magnetic field is increased correspondingly with retraction, thereby preventing the retracting force from decreasing with retraction due to increased flux leakage and changing boundary conditions. The necessary resistance of resistor 54, for any particular actuator, is determined by sensing retracting force while varying the position of element 14, and adjusting the value of resistance 54 to obtain the desired constant force characteristic.

The resistors 55, 56 and 57 in FIG. 3 are for the purpose of making the force independent of any variations in supply voltage to the system. Alternative methods of controlling the current or voltage to the coil in response to the output of amplifier 40 could make these resistors unnecessary.

If the flux sensor 26 were not located at the end of the actuator remote from the variable gap 24, it would not be sensing the total of both flux in the variable gap and leakage flux. For example, if located in the variable gap 24, the flux sensor would sense only flux in such gap without sensing any leakage flux. To obtain constant force, the circuit of FIG. 3 therefore would have to be modified to decrease the sensed field progressively only during a first portion of extension and then increase the sensed field thereafter to compensate for varying boundary conditions. The advantage of placement of the Hall sensor 26, as shown in FIG. 1, therefore, is that its sensitivity to the total flux, including leakage flux, enables the force control circuit to compensate for all variables by a progression in only one direction during extension or, alternatively, during retraction.

Supplementary to the negative DC feedback of resistor 54, compensation for leakage flux and the other foregoing variables to yield the desired constant force characteristic could be aided in some configurations by nonuniform shaping of the element 14 so that its cross-section and reluctance vary with position, or by further nonuniform shaping of the coil. Moreover, equivalent circuit alternatives or additions to the negative DC feedback of resistor 54 could be employed to yield similar results, such as modifying the shape of the sawtooth signal generated by the aforementioned oscillator to vary the flux density sensed by the sensor 26 in relation to changes in coil current.

Position Sensing and Control System

In the circuit of FIG. 3, where the flux is controlled so as to yield substantially constant force, the position of the actuator can be determined with reasonable accuracy by measuring coil current, for example, by indicating the voltage difference across resistor 59 by means of a voltmeter or other suitable readout device *59a*. Alternatively, for position sensing or control irrespective of force and coil current variations, the circuit of FIG. 3 may be replaced by the circuit of FIG. 4. The position sensing feature of the circuit of FIG. 4 operates on the principle that the position "X", i.e. the degree of extension of element 14, may be described at least approximately by the following equation:

$$X-k\sim Ic/B$$

where

X is position
k is a constant
Ic is the current in the coil
B is the flux density of the field produced by the coil.

Consequently, by dividing the output from the Hall effect sensor 26, which is proportional to the flux density B, into the value of the current Ic in the coil 10, a signal representative of position, irrespective of changes in force and coil current, may be generated.

The foregoing principle applies with sufficient accuracy despite the presence of flux leakage, and despite the placement of the sensor 26, because the leakage reluctance increases with extension (due to decreasing leakage area) as does the reluctance of the primary magnetic circuit (due to increasing length of gap 24). Placement of the flux sensor 26 in the variable gap 24, or in a fixed gap adjacent the variable gap 24, would remove the effects of the leakage, in any case.

The operation of a Hall effect sensor is such that its output voltage Vh is proportional to the product of its sensed flux density B and its excitation current Ih. Therefore, if the excitation current Ih is automatically variably controlled so that Vh and Ic are maintained proportional to each other, the following relationships develop:

$$(Ih)(B) \sim Vh \sim Ic$$

$$Ih \sim Ic/B$$

$$X - k \sim Ih$$

$$X \sim Ih + k$$

Figure 4:
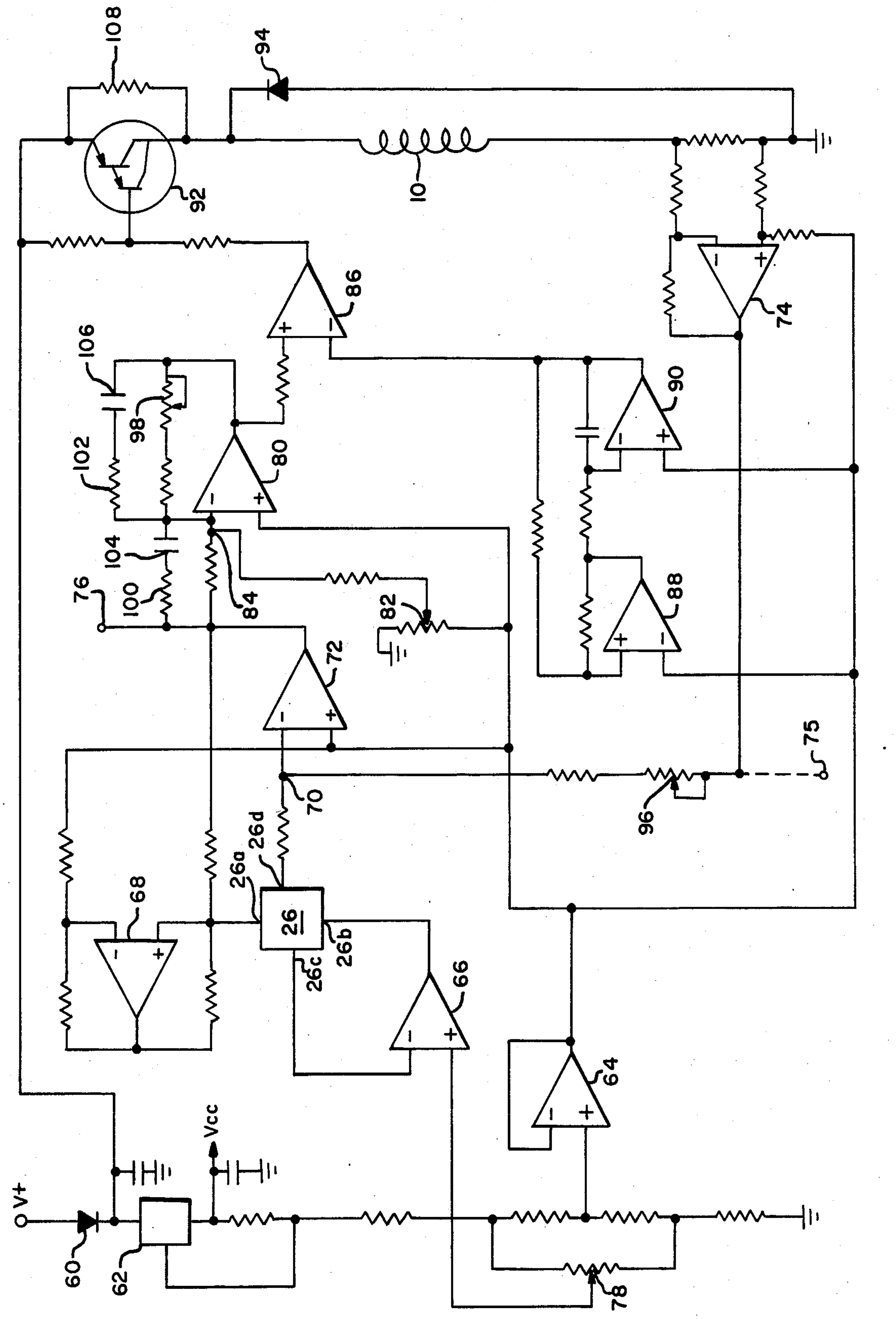
FIG. 4 is a diagram of an exemplary electrical circuit for position sensing and position control, usable with the actuator of FIG. 1.

The circuit of FIG. 4, therefore, is designed to make it possible to sense the position X of the actuator merely by measuring the excitation current Ih of the Hall effect sensor 26.

In FIG. 4, as in FIG. 3, a diode 60 protects the circuit from reverse voltage application at the supply, and supply voltage is controlled by a voltage regulator 62. Amplifier 64 buffers the common supply voltage so that some current can be drawn from the common bus without affecting its voltage. Amplifier 66 controls one of the excitation terminals *26b* of the Hall effect sensor 26 to keep one of the output terminals *26c* thereof at a common reference potential equal to that at the output of amplifier 64, for the reasons described previously. Amplifier 68, together with its associated resistors, provides a voltage-controlled current source that supplies the Hall effect sensor in a known manner independently of the internal resistance of the sensor, which is variable with temperature.

The output of the Hall effect sensor 26 is combined at a summing junction 70, at the inverting input of amplifier 72, with a signal from amplifier 74 representative of the magnitude of current Ic in the coil 10. Amplifier 72 controls the excitation current Ih in the Hall effect sensor such that the Hall sensor output Vh and the output of amplifier 74 are always equal. Accordingly, the magnitude of the excitation current Ih of the Hall sensor becomes proportional to the position of the actuator and is represented by the signal at output 76. An adjustable potentiometer 78 is set so that the position signal is accurate regardless of the amount of current in the coil 10.

If position control, rather than merely position sensing, is desired, the actual position of the actuator, as represented by the output of amplifier 72, is compared at a summing junction 84 with a position input reference signal adjustable by means of potentiometer 82. The result of the comparison is an error signal presented to the inverting input of amplifier 80. Depending upon the direction of deviation of the movable element 14 from the desired position, the output of amplifier 80 will either increase or decrease to reduce the error signal. The output of amplifier 80 is presented to a comparator 86 which combines it with the output from a sawtooth oscillator composed of amplifiers 88 and 90, respectively. Comparator 86 controls the duty cycle of a power transistor 92 in a pulse-width modulated manner to control coil current so as to reduce the aforementioned error signal and thereby maintain the selected position of the element 14. Diode 94 is a flyback diode used for the same purpose as previously discussed. A position range adjuster 96 is used to set the ratio between the motion of the actuator and the change in the position feedback signal (the output of amplifier 72). Resistors 98, 100 and 102, and capacitors 104 and 106, are chosen and adjusted to achieve stable and well-damped positioning performance. The shunt resistor 108 keeps the current in the coil 10 from decreasing to zero so that the position feedback system will continue to operate when the transistor 92 is switched off.

As an adjunct to the general concept of position control of a variable reluctance linear actuator, it is noteworthy that, just as force control makes it possible to sense approximate position from the magnitude of the coil current, position control makes it possible to sense approximate actuating force from the magnitude of the coil current. Although the relationships will normally not be linear, they will be predictable and therefore appropriate calibration can yield useful readings. For example, in FIG. 4, the output of amplifier 74 could be indicated at output 75 to measure actuating force magnitude, at least approximately, because it is representative of the magnitude of current in the coil 10.

Theoretically, the optimum setting of potentiometer 78 is such that the independence of the position signal from coil current is optimized. However, such setting would be dangerously close to a condition where transient variables could render the position control system inoperative. Accordingly, the practical optimum setting of potentiometer 78 preferably permits a small dependence of the position signal on coil current. Such small dependence can be at least partially compensated for by adjusting the gain of amplifier 80 by adjustment of variable resistor 98, which variably regulates the stiffness of the position control system, i.e., the relationship between the magnitude of the correcting force and the magnitude of deviation from a desired position.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A variable reluctance actuator, comprising:

(a) coil means for producing a magnetic field in response to an electrical current therein;

(b) actuator means, at least a portion of which comprises magnetic material magnetically coupled to said coil means by a magnetic circuit, for producing mechanical force in response to the effect of magnetic flux on said portion, said portion of said actuator means and said coil means being mounted for movement relative to each other;

(c) sensor means, magnetically coupled to said coil means by said magnetic circuit, for sensing the magnitude of the instantaneous magnetic flux density produced by said coil means at a location in said circuit and producing an electrical signal in response thereto, and means for producing an excitation current in said sensor means, said electrical signal being proportional to the product of said excitation current and said instantaneous magnetic flux density sensed by said sensor means at said location; and (d) means for sensing the magnitude of the current in said coil means and variably controlling said excitation current of said sensor means in response thereto so as to cause said electrical signal to be proportional to the magnitude of the current in said coil means.

2. The actuator of claim 1, including control means, responsive to said excitation current, for controlling said electrical current in said coil means in a predetermined manner in response to said excitation current throughout said predetermined range of relative motion.

3. The actuator of claim 2 wherein said control means comprises means, responsive to said excitation current, for controlling said electrical current in said coil means so as to produce a predetermined position of said coil means and portion of said actuator means relative to each other.

4. The actuator of claim 2 wherein said control means comprises means for producing a position input signal, and a position sensing signal responsive to the magnitude of said excitation current of said sensor means, and further comprises means for comparing said position input signal to said position sensing signal, and producing an error signal representative of the difference therebetween, and means responsive to said error signal for adjusting the electrical current in said coil means so as to reduce said error signal.

5. The actuator of claim 4, further including means for adjustably varying said position input signal.

6. A magnetic device comprising:

(a) means for producing a magnetic field;

(b) sensor means magnetically coupled to said magnetic field for producing an electrical signal responsive to the magnitude of the instantaneous magnetic flux density therein, said sensor means having a pair of output terminals having an electrical potential difference responsive to the magnitude of the instantaneous magnetic flux density sensed by said sensor means, and further having a pair of excitation terminals for producing an excitation current in said sensor means, said elelctrical potential difference being proportional to the product of said excitation current and said instantaneous magnetic flux density sensed by said sensor means; and (c) amplifier means controlling the potential at one of said excitation terminals, in response to the potential at one of said output terminals, for maintaining said one of said output terminals at a predetermined reference potential by variable control of the potential at said one of said excitation terminals.

7. A method of controlling the force between two relatively movable portions of a variable reluctance actuator which includes a coil for producing a magnetic field in response to an electrical current therein and magnetic material in said two portions coupled to said coil by a magnetic circuit such that mechanical force is produced between said two portions in response to the effect of said magnetic field thereon, said method comprising:

(a) sensing the magnitude of the instantaneous magnetic flux density produced by said coil at a location in said magnetic circuit and producing a flux density signal in response thereto;

(b) producing a force command signal whose magnitude is representative of a desired mechanical force between said two portions; and (c) variably controlling said current is said coil in response to both said flux density signal and force command signal throughout a predetermined range of relative movement between said two portions so as to stabilize said mechanical force by varying the magnitude of the flux density sensed in step (a) to a greater degree proportionally than any concurrent variation in the magnitude of said force command signal or said mechanical force.

* * * * *

UNITED STATES PATENT AND TRADEMARK OFFICE
CERTIFICATE OF CORRECTION

PATENT NO. : 4,656,400

DATED : April 7, 1987

INVENTOR(S) : Robert M. Pailthorp et al

It is certified that error appears in the above-identified patent and that said Letters Patent is hereby corrected as shown below:

Col. 10, line 36 Change "is" to --in--.

Signed and Sealed this

Twenty-ninth Day of September, 1987

*Attest:*

DONALD J. QUIGG

*Attesting Officer* *Commissioner of Patents and Trademarks*